US011911779B1

(12) United States Patent
Mai

(10) Patent No.: US 11,911,779 B1
(45) Date of Patent: Feb. 27, 2024

(54) INTEGRATED SHOWER RINSE SYSTEM

(71) Applicant: Heshan KES Sanitary Ware Limited, Heshan (CN)

(72) Inventor: Jiajun Mai, Heshan (CN)

( * ) Notice: Subject to any disclaimer, the term of this patent is extended or adjusted under 35 U.S.C. 154(b) by 0 days.

(21) Appl. No.: 18/371,314

(22) Filed: Sep. 21, 2023

(51) Int. Cl.
*B05B 1/16* (2006.01)
*E03C 1/04* (2006.01)
*B05B 12/00* (2018.01)
*B05B 1/18* (2006.01)

(52) U.S. Cl.
CPC .......... *B05B 1/1609* (2013.01); *B05B 12/002* (2013.01); *E03C 1/0409* (2013.01); *B05B 1/18* (2013.01)

(58) Field of Classification Search
CPC .... B05B 1/12; B05B 1/14; B05B 1/16; B05B 1/1609; B05B 1/18; B05B 1/185; B05B 12/002; B05B 12/0022; E03C 1/0408; E03C 1/0409
See application file for complete search history.

(56) References Cited

U.S. PATENT DOCUMENTS

2022/0143630 A1* 5/2022 Hong ........................ B05B 1/18
2022/0184643 A1* 6/2022 Zhadanov ............... B05B 1/185
2022/0241801 A1* 8/2022 Zhang ................... B05B 1/1636
2022/0250097 A1* 8/2022 Lin .......................... B05B 1/326
2022/0280955 A1* 9/2022 Lin ....................... B05B 12/002

* cited by examiner

*Primary Examiner* — Darren W Gorman

(57) ABSTRACT

Aspects of the disclosed technology provide solutions for improving a shower head with a rinse function and in particular, for improving the safety of a shower head with a rinse jet function. An integrated shower rinse system features a handle equipped with both a shower head and a rinse jet. The system incorporates an inlet for water reception. By default, water flows through the shower head upon initial system activation. A button on the handle, when pressed, diverts the water flow to the rinse jet. Additionally, a switch on the handle allows users to choose various nozzle settings for the rinse jet. An internal spring mechanism ensures that in the absence of water, the rinse jet activation button remains in the off position. As a result, water initially flows through the shower head each time the system is activated, requiring manual button engagement for rinse jet operation.

7 Claims, 4 Drawing Sheets

INTEGRATED SHOWER RINSE SYSTEM

TECHNICAL FIELD

The present disclosure generally relates to solutions for improving a shower head with a rinse function and in particular, for improving the safety of a shower head with a rinse jet function.

BACKGROUND

An integrated shower rinse system may include a traditional shower head and a secondary rinse jet capable of outputting a concentrated and powerful water stream for rinsing. For example, the rinse jet may facilitate efficient removal of soap, shampoo, or conditioner from the body and hair. The integration of a rinse jet with a traditional shower head may offer an enhanced cleaning experience with the shower head and rinse jet both effective for different cleaning scenarios.

BRIEF DESCRIPTION OF THE DRAWINGS

The various advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

Figure 1:
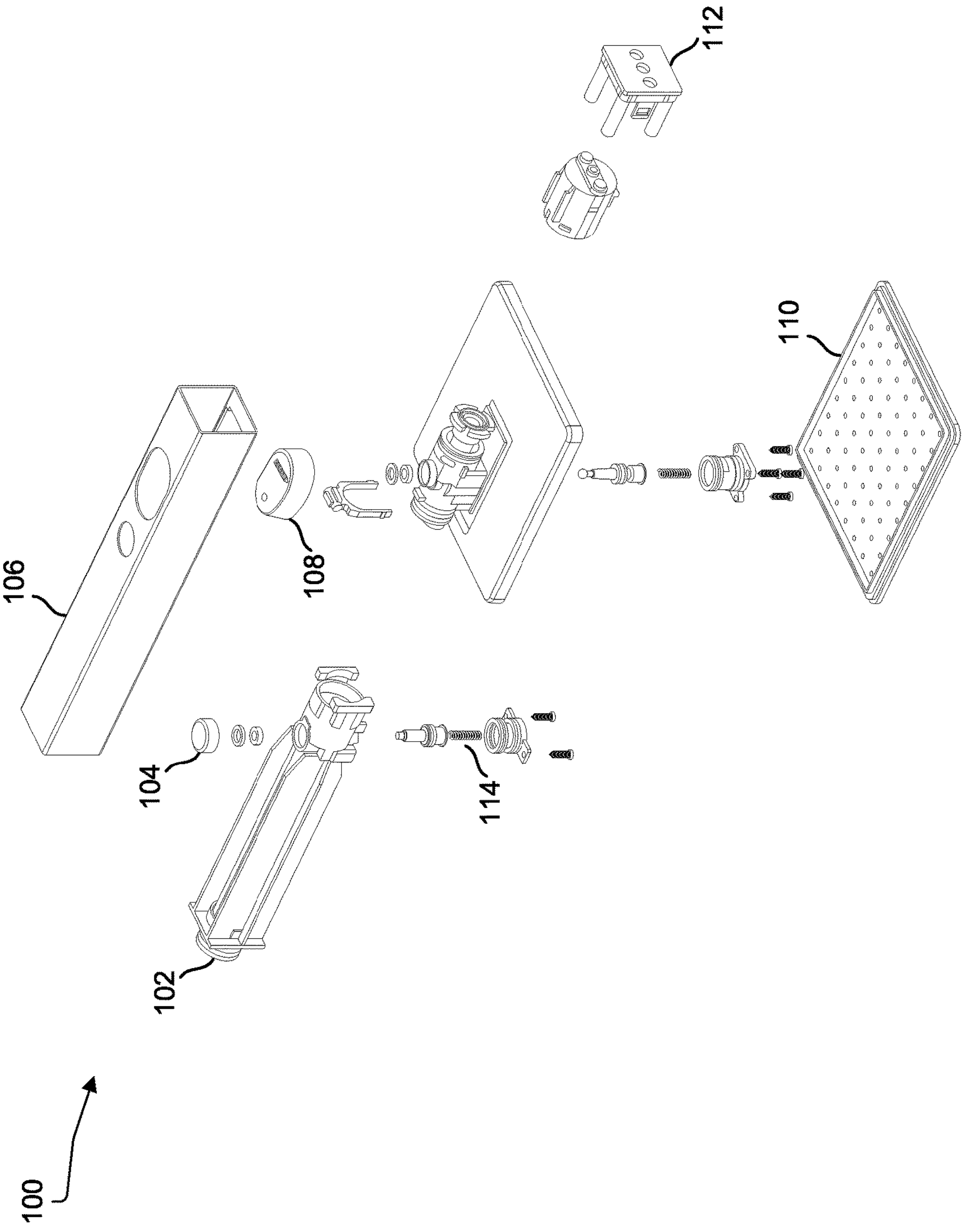
FIG. 1 illustrates an example of an integrated shower rinse system, according to some aspects of the disclosed technology.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form to avoid obscuring the concepts of the subject technology.

An integrated shower rinse system comprising of a shower head with an attached rinse jet (also jet, nozzle, rinse nozzle, jet stream) may provide a user with comfort and efficiency. In some aspects, a handle with an attached shower head that integrates a rinse jet function may be an effective tool for cleaning and hygiene. An integrated shower rinse system possessing both a standard shower head and a rinse jet with intensified rinsing capabilities (e.g., via a high-pressure water stream) in a single unit may address different bathing, cleaning, and hygiene needs.

By way of example, a conventional showering experience with only a traditional shower head may provide a gentle and even water flow that can envelope the user and may also provide a relaxing and effective cleansing method. In some instances, a concentrated or high-pressure water flow compared to a traditional shower head may be beneficial. For instance, a user may grasp the handle of an integrated shower rinse system and direct the rinse jet at areas of the body that may benefit from its water pressure for thorough cleaning. A more forceful and targeted water stream from a rinse jet may ensure various types of substances and particles are thoroughly cleaned from the human body. Examples of substances and particles on the human body that may benefit from a rinse jet may include, but are not limited to, natural oils, sweat, dirt, stray hair, human secretions, grime, dead skin cells, cosmetic products, hair products, bacteria, microorganisms, odors, and residues (e.g., chlorine, paint, sawdust, etc.).

In some examples, the handle of the integrated shower rinse system may include a switch or button that enables dual functionality of the shower head and rinse jet. The button or switch may be activated to enable the rinse jet function. In some cases, an integrated shower rinse system may be designed such that when turning the water on (e.g., water is received into the integrated shower rinse system), the rinse jet may be activated as a default or initial state (e.g., the water is outputted via the rinse jet instead of the shower head). For example, if the previous user of the integrated shower rinse system left the button or switch in the state that activates the rinse jet function and turned the water off, the integrated shower rinse system would be maintained in the state of an activated rinse jet function. In this example, the subsequent user of the integrated shower rinse system may then turn the water on, and the water may initially flow out via the rinse jet rather than the shower head. In some cases, the user may not notice the button or switch is activated for the rinse jet, and the high pressure output of water flowing from the rinse jet unexpectedly may be undesirable and consequential and may even cause a potential safety hazard (e.g., the high pressure water from the rinse jet may damage objects or cause injury to the user).

Solutions are provided herein for an integrated shower rinse system with a shower head and rinse jet such that the initial state or default state of the integrated shower rinse system can be water flowing via the shower head rather than the rinse jet. For example, when a user activates the rinse jet (e.g., after turning the water on such that water is received by the integrated shower rinse system) and turns the water off without deactivating the rinse jet, the default state for the next user will be a water output or water flow from the shower head. By way of example, the button or switch that enables the rinse jet function may require water to be present as a precondition for the rinse jet function to be activated. If the water is turned off and as a result water is no longer received by the integrated shower rinse system, the button or switch that activates the rinse jet function is deactivated and the integrated shower rinse system returns to the default state of water output or water flow via the shower head.

FIG. 1 illustrates an example of an integrated shower rinse system 100, according to some aspects of the disclosed technology. By way of example, integrated shower rinse system 100 may be constructed from one or more components as illustrated in FIG. 1. The one or more components of integrated shower rinse system 100 may be constructed from materials resistant to water (e.g., water damage such as rust) including, but not limited to, stainless steel, plastic (e.g., ABS, polypropylene), silicone, rubber, gold, brass, ceramic, and zinc alloy. A pipe (also pipeline, water pipe) 102 may receive water or a water flow that may be channeled (e.g., via a plumbing system not illustrated) into pipe 102 for water distribution via integrated shower rinse system 100. The water (e.g., received via pipe 102) may be distributed throughout integrated shower rinse system 100 and may be outputted via shower head (also shower nozzle, shower spout, shower emitter, rainfall shower head) 110 and/or outputted via rinse jet 112. In some cases, integrated shower rinse system 100 may output water simultaneously via shower head 110 and rinse jet 112. In another example, integrated shower rinse system 100 may output water via shower head 110 or rinse jet 112 (e.g., water may not be flowing simultaneously via both shower head 110 and rinse jet 112).

As discussed above, water may be received into (e.g., via pipe 102) integrated shower rinse system 100 by turning on the water via a faucet (also a handle, valve, switch) not illustrated in FIG. 1. By way of example, a user may activate a valve to control temperature and pressure of the water directed to integrated shower rinse system 100. In some aspects, when integrated shower rinse system 100 receives water initially (e.g., from a state where no water is present to a state where water is present), the water may initially output via shower head 110. A handle 106 may house one or more buttons 104 and one or more switches 108.

In some instances, button 104 may be activated to output water via rinse jet 112. For example, activating button 104 may re-direct the flow of water to output via rinse jet 112 instead of shower head 110 (e.g., water may initially output from shower head 110 when received by integrated shower rinse system 100). In some cases, activating button 104 may be performed by pressing button 104 downwards into handle 106. For example, when rinse jet 112 is in an off state (e.g., water is flowing via shower head 110), button 104 may protrude or extend away or outwards from handle 106. In some examples, a user may activate button 104 by pressing button 104 into or towards handle 106. In some cases, when activated, button 104 may be flush with handle 106. In some aspects, switch 108 may be activated to modify the output or flow of water via rinse jet 112. For example, the water intensity, water pressure, or number of output spouts of rinse jet 112 may be modified by turning on or activating switch 108. Those skilled in the art will appreciate additional settings of rinse jet 112 that may be activated or set via switch 108.

In some aspects, when integrated shower rinse system 100 stops receiving water (e.g., a user turns the faucet off or shuts off the water), spring system 114 may apply pressure or force towards button 104 to deactivate rinse jet 112. For example, if integrated shower rinse system 100 while in an active or on state is outputting water via rinse jet 112 and button 104 is activated (e.g., pressed down) and a user turns the water off, then spring system 114 may apply a force towards button 104 to deactivate it (e.g., spring system 114 may push button 104 away or outwards from handle 106 such that button 104 is in an off state). In other words, when water is not present or if the water pressure is low (e.g., less than 0.05 megapascals) in integrated rinse system 100 (e.g., in pipe 102), then spring system 114 may apply a force to button 104 such that when water returns to integrated rinse system 100, the default output of water is via shower head 110. When a user is turning on a faucet to start the flow of water (e.g., from an off state to an on state), the output can be via shower head 110 as the initial state and button 104 can be in the off or deactivated state.

Figure 2:
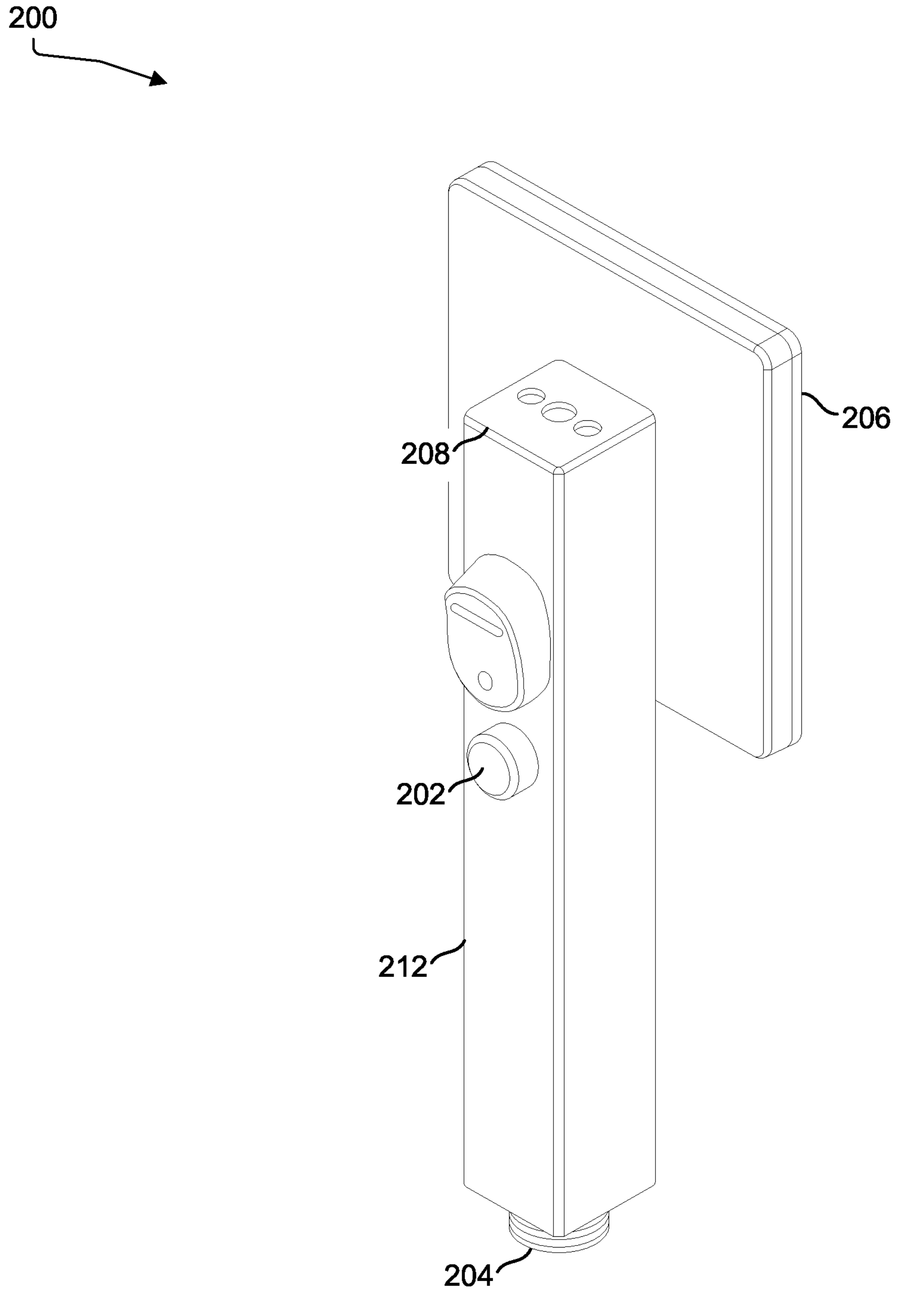
FIG. 2 illustrates another example of an integrated shower rinse system, according to some aspects of the disclosed technology.

FIG. 2 illustrates another example of an integrated shower rinse system 200, according to some aspects of the disclosed technology. By way of example, integrated shower rinse system 200 may be the assembled integrated shower rinse system 100 as illustrated in FIG. 1. In some cases, water may be received by integrated shower rinse system 200 via inlet (also opening or inlet connector) 204. In some instances, integrated shower rinse system 200 may be permanently attached or fixed to a structure such as a shower pipe, pipe, wall, or other structure. In some cases, integrated shower rinse system 200 may be detachable such that a user may hold integrated shower rinse system 200 (e.g., via handle 212) and a hose (e.g., flexible hose) may attach to inlet 204 for water flow into integrated shower rinse system 200.

As discussed above with respect to FIG. 1, in some examples when there is no water present in integrated shower rinse system 200, button 202 that may activate rinse jet 208 can be in an off state and rinse jet 208 can be inactive. In some cases, when water is present in integrated shower rinse system 200 and button 202 is activated (e.g., pressed down or flush into handle 212) and water is flowing via rinse jet 208 and subsequently the water is turned off, an internal spring may apply force to button 202 to deactivate it. When water flow returns (e.g., from a deactivated off state to an active on state) to integrated shower rinse system 200, the default output or flow of water can be via shower head 206.

Figure 3:
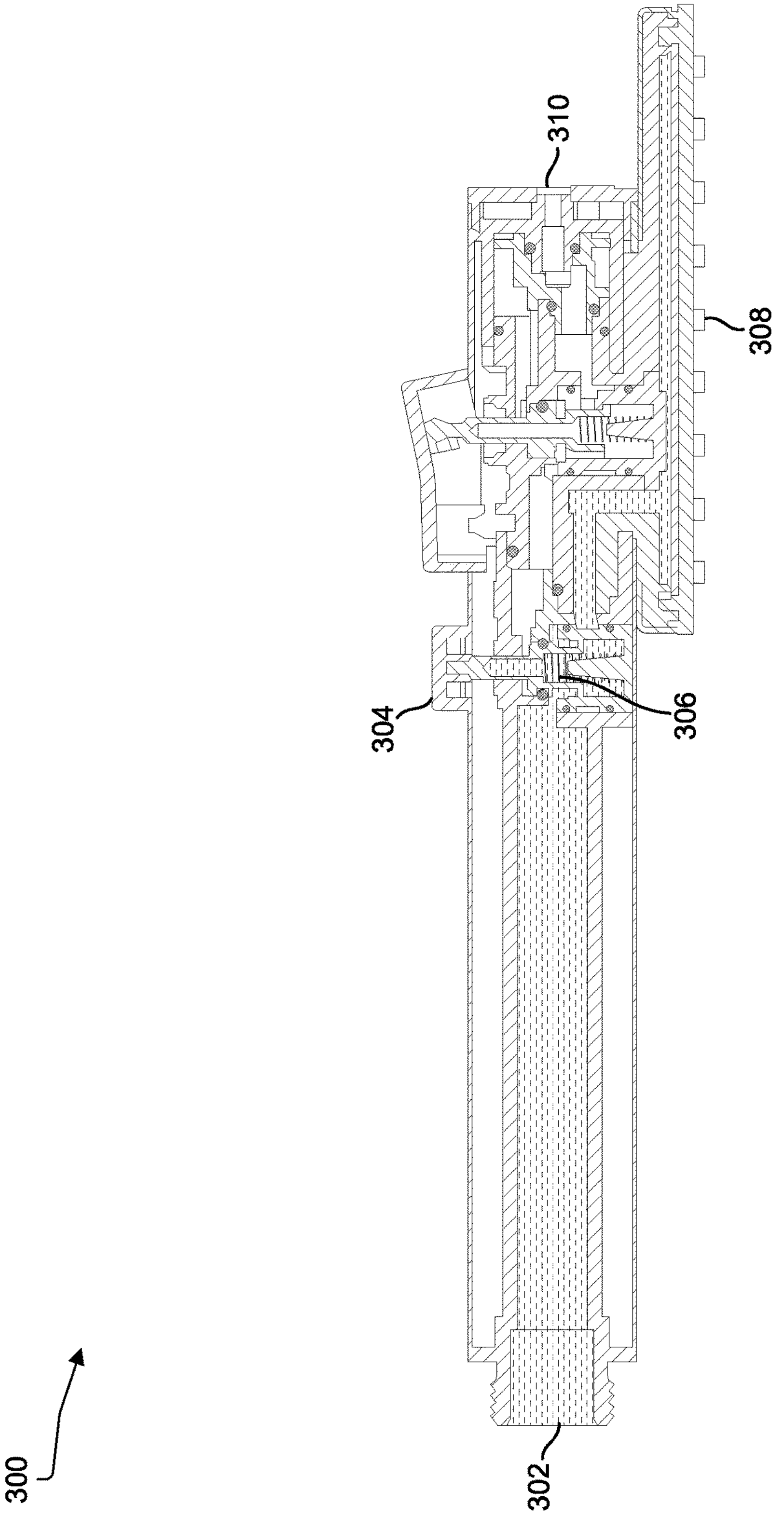
FIG. 3 illustrates an example of an integrated shower rinse system with water flow via a shower head, according to some aspects of the disclosed technology.

FIG. 3 illustrates an example of an integrated shower rinse system 300 with water flow via a shower head 308, according to some aspects of the disclosed technology. In some cases, integrated shower rinse system 300 can be integrated shower rinse system 100 as discussed above in FIG. 1. In some cases, a flow of water 302 can move through integrated shower rinse system 300. In some examples, when integrated shower rinse system 300 initially receives (e.g., via an inlet) water 302 (e.g., after a previous state without water 302 or an off state), water 302 may flow directly to shower head 308. As illustrated in FIG. 3, a spring system 306 may maintain button 304 in a deactivated state when water 302 is not present (e.g., or if the water pressure is below a pre-determined threshold) and when water 302 initially begins to travel through integrated shower rinse system 300. As discussed above, when button 304 is activated (e.g., pressed down), water 302 may flow out via rinse jet 310 instead of via shower head 308. In some examples, when there is no water 302 present in integrated shower rinse system 300 or if the water pressure is below 0.05 megapascals (MPa), then spring system 306 may maintain button 304 in a deactivated or off state.

Figure 4:
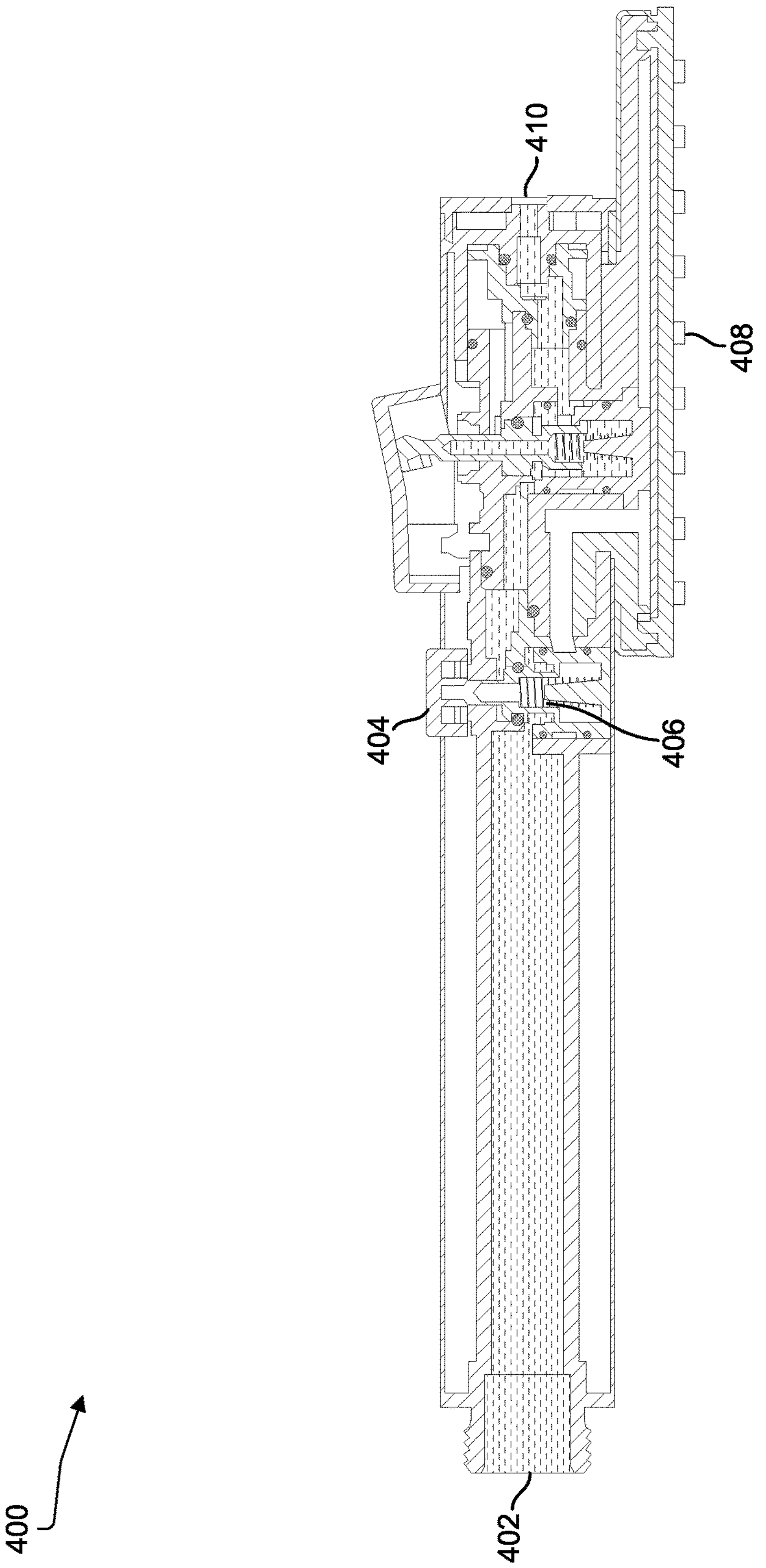
FIG. 4 illustrates an example of an integrated shower rinse system with water flow via a rinse jet, according to some aspects of the disclosed technology.

FIG. 4 illustrates an example of illustrates an example of an integrated shower rinse system 400 with water flow via a rinse jet 410, according to some aspects of the disclosed technology. In some cases, integrated shower rinse system 400 can be integrated shower rinse system 100 as discussed above in FIG. 1. In some examples, when integrated shower rinse system 400 receives water 402 (e.g., initially receives water after being in an off state without water 402), water 402 may flow directly to shower head 408. As illustrated in FIG. 4, button 404 can be in an activated state when pressed into or towards the handle of integrated shower rinse system 400. By way of example, activating button 404 may direct the flow of water 402 to rinse jet 410 instead of shower head 408.

Claim language or other language in the disclosure reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

What is claimed is:

1. An integrated shower rinse system, comprising:

a handle;

a shower head coupled to the handle, wherein a water flow, upon initial receipt into the integrated shower rinse system, flows by default through the shower head;

a rinse jet coupled to the handle;

a button disposed on the handle, wherein activation of the button diverts the water flow from the shower head to the rinse jet;

a switch disposed on the handle for selecting one or more settings of the rinse jet, wherein the one or more settings comprises at least one of pressure, intensity, number of output spouts of the rinse jet, or a combination thereof, and a spring system internal to the handle, wherein in the absence of the water flow or a water pressure lower than 0.05 megapascals (MPa), the spring system maintains the button in an off position ensuring that upon the initial receipt of the water flow, the button remains deactivated, and the water flow moves through the shower head.

2. The integrated shower rinse system of claim 1, further comprising:

an inlet, wherein the inlet receives the water flow from an external water source.

3. The integrated shower rinse system of claim 2, wherein the integrated shower rinse system is removable, and a flexible hose is attached to the inlet.

4. The integrated shower rinse system of claim 1, wherein the integrated shower rinse system is permanently affixed to a wall or shower pipe.

5. The integrated shower rinse system of claim 1, wherein the handle is constructed from at least one of stainless steel, plastic, silicone, rubber, gold, brass, ceramic, zinc alloy, or a combination of thereof.

6. The integrated shower rinse system of claim 1, wherein the shower head is constructed from at least one of stainless steel, plastic, silicone, rubber, gold, brass, ceramic, zinc alloy, or a combination of thereof.

7. The integrated shower rinse system of claim 1, wherein the rinse jet is constructed from at least one of stainless steel, plastic, silicone, rubber, gold, brass, ceramic, zinc alloy, or a combination of thereof.

* * * * *